(12) United States Patent
Hippel et al.

(10) Patent No.: US 7,150,500 B2
(45) Date of Patent: Dec. 19, 2006

(54) VEHICLE SEAT WITH ANTISUBMARINING RAMP

(75) Inventors: Daniel Hippel, Winnweiler (DE); Bernhard Müller, Waldmohr (DE); Henning Schneider, Wolfstein (DE); Harald Klein, Matzenbach (DE); Michael Böhmer, Rockenhausen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/350,238

(22) Filed: Feb. 8, 2006

(65) Prior Publication Data

US 2006/0125296 A1 Jun. 15, 2006

Related U.S. Application Data

(63) Continuation of application No. PCT/EP2004/009526, filed on Aug. 26, 2004.

(30) Foreign Application Priority Data

Sep. 5, 2003 (DE) .................. 103 40 996

(51) Int. Cl.
*B60N 2/42* (2006.01)

(52) U.S. Cl. .............. 297/216.1; 297/216.11; 297/284.11

(58) Field of Classification Search ........... 297/216.1, 297/216.11, 284.11, 284.4, 284.1, 452.21
See application file for complete search history.

(56) References Cited

U.S. PATENT DOCUMENTS

| 5,556,160 | A | 9/1996 | Mikami | |
|---|---|---|---|---|
| 5,695,242 | A | 12/1997 | Brantman et al. | |
| 5,697,672 | A * | 12/1997 | Mitchell | 297/284.4 |
| 5,908,220 | A * | 6/1999 | Bauer et al. | 297/284.1 |
| 6,386,633 | B1 * | 5/2002 | Newton | 297/284.1 |
| 6,419,317 | B1 * | 7/2002 | Westrich et al. | 297/284.11 |
| 6,550,863 | B1 | 4/2003 | Dill et al. | |
| 6,715,788 | B1 * | 4/2004 | Saiguchi et al. | 280/730.1 |
| 6,752,454 | B1 * | 6/2004 | Ruel et al. | 297/216.1 |
| 6,837,540 | B1 * | 1/2005 | Yamaguchi et al. | 297/216.1 |
| 6,935,684 | B1 * | 8/2005 | Sakai | 297/216.1 |
| 2002/0043847 | A1 | 4/2002 | Dill et al. | |

FOREIGN PATENT DOCUMENTS

| DE | 3631 881 A1 | 4/1988 |
|---|---|---|
| DE | 3841 688 A1 | 6/1990 |
| DE | 100 37 327 A1 | 2/2002 |
| EP | 1 042 139 B1 | 10/2000 |
| EP | 1 067 015 A1 | 1/2001 |
| FR | 2 716 423 A1 | 8/1995 |
| FR | 2 772 689 A1 | 6/1999 |

* cited by examiner

*Primary Examiner*—Peter M. Cuomo
*Assistant Examiner*—Erika Garrett
(74) *Attorney, Agent, or Firm*—Womble Carlyle Sandridge & Rice, PLLC

(57) ABSTRACT

In the case of a vehicle seat, in particular a motor vehicle seat, with a seat part structure (5), a seat cushion (7) positioned on the seat part structure (5) and an antisubmarining ramp (11) effective at the latest at the beginning of a crash, the antisubmarining ramp (11) is movable in a recess (9) of the seat cushion (7).

20 Claims, 2 Drawing Sheets

VEHICLE SEAT WITH ANTISUBMARINING RAMP

CROSS-REFERENCE TO RELATED APPLICATION

The present application is a continuation of PCT/EP2004/009526, which was filed Aug. 26, 2004. The entire disclosure of PCT/EP2004/009526 is incorporated herein by reference.

BACKGROUND OF THE INVENTION

The present invention relates to a vehicle seat, in particular a motor vehicle seat, with a seat part structure, a seat cushion positioned on the seat part structure and an antisubmarining ramp effective at the latest at the beginning of a crash.

DE 36 31 881 C2 discloses a vehicle seat of the type described immediately above, with a restraint device which, triggered pyrotechnically in a crash, both pulls a belt buckle downward and also, by means of an expanding joint, raises a pivotable seat wedge. The pivotable seat wedge is provided in the seat cushion and acts as an antisubmarining ramp.

BRIEF SUMMARY OF SOME ASPECTS OF THE INVENTION

An aspect of the present invention is the provision of improvements to a vehicle seat of the type mentioned above. In accordance with an aspect of the present invention, a vehicle seat, in particular a motor vehicle seat, includes a seat part structure (5), a seat cushion positioned on the seat part structure, and an antisubmarining ramp that is effective at the latest at the beginning of a crash, with the antisubmarining ramp being movable in a recess of the seat cushion.

Because the antisubmarining ramp is movable in a recess of the seat cushion, i.e. within the seat cushion, upholstery compressions which act counter to a movement of the antisubmarining ramp are avoided in the seat cushion. The maximum comfort is achieved in a normal situation. In a crash, the active antisubmarining ramp preferably stiffens the seat cushion which is normally flexible. A reduction in comfort therefore takes place only in a crash. The movement of the antisubmarining ramp requires only a small amount of energy, since neither does the occupant have to be raised nor foam compressed, but rather the recess which is present has merely to be filled or supported (e.g., the recess is normally present prior to the antisubmarining ramp being activated, so that only a small amount of energy is required for moving the antisubmarining ramp in the recess). The shape of the recess and the mobility of the antisubmarining ramp are coordinated with each other, i.e. the shape of the recess is produced primarily by the space over which the antisubmarining ramp passes during its movement from an inoperative position into an operative position, preferably with the padding surrounding the space being straightened and/or smoothed. Convex padding parts which are not load-bearing and not supporting are preferably avoided, i.e., in particular it is preferred to avoid the inclusion of padding parts that protrude into the space over which the antisubmarining ramp passes during its movement from the inoperative position into the operative position.

In one preferred embodiment, the active antisubmarining ramp is a hoop which can be pivoted within the recess; in particular the hoop can be pivoted from a flat position (inoperative position) into a raised position (operative position). The raised position is defined, for example, by means of a stop. In the present case, the term "hoop" is to be interpreted within a wide meaning, so that it may also include other structural components, for example a sheet-metal plate. The term "flat" is intended to describe an essentially horizontal arrangement, for example an arrangement bearing against the seat part structure. The hoop is mounted in a space-saving manner preferably on the seat part structure, with the precise position depending on the requirements. For simple mounting, a simple pivoting movement, a small amount of construction space being required, and a low weight with maximum stability, the hoop encloses an at least approximately rectangular area and can be pivoted about one longitudinal side.

The movable antisubmarining ramp, in particular in the refinement as a pivotable hoop, is preferably prestressed (e.g., biased), generally by means of at least one spring, so that a pyrotechnic triggering can be avoided. The spring is set in such a manner that it can raise the hoop even if a vehicle seat is in use. A pivotable catch, a hook or another retaining element preferably normally secures the antisubmarining ramp (the hoop), with it being possible for this to take place non-positively and/or positively.

The triggering of the pivoting movement of the hoop takes place preferably electrically, so that the sensor arrangement present in the vehicle, for example for the airbag, can be used. In addition, the system is pre-safe-capable, i.e. the antisubmarining ramp can be activated even before an actual crash, for example in a phase of severe deceleration. The retaining element is released by an actuator, for example by a servomotor or a magnet which normally secures the retaining element at least indirectly and releases it at the latest at the beginning of the crash, for example, by changing its magnetic field due to a change in its power supply. All of the retaining elements, actuators and the like are preferably arranged within the construction space enclosed by the flat hoop and add only little in terms of space, so that a small construction space is required and the effect on the seat comfort is negligible. In order to support the raised position (operative position) of the hoop, the hoop preferably has at least one support which, for example, is opened out, so that a return movement is prevented.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which.

DETAILED DESCRIPTION OF THE EXEMPLARY EMBODIMENT

Figure 1:
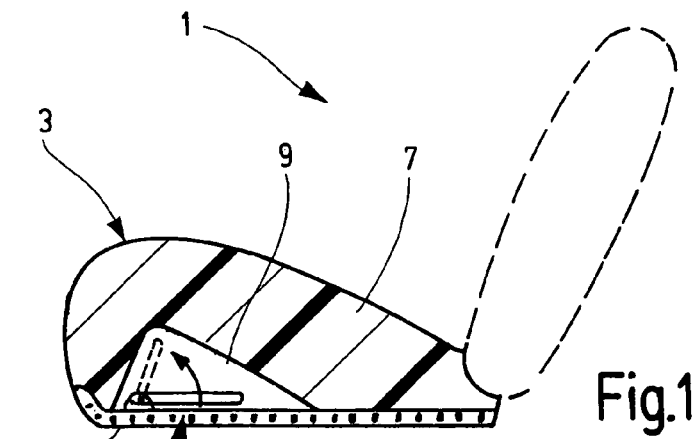
FIG. 1 shows a partially schematized section through a vehicle seat designed in accordance with the invention.
Figure 2:
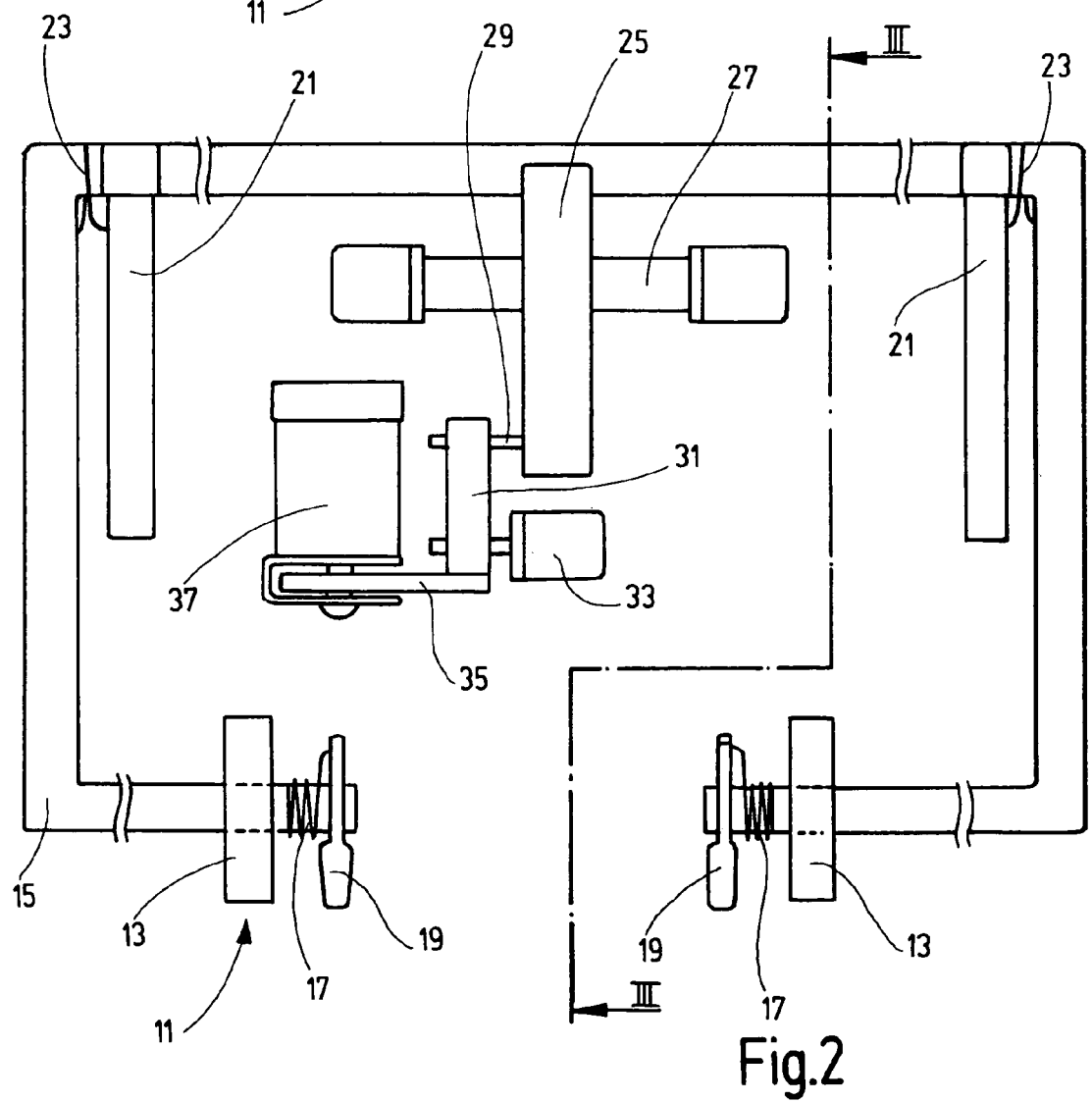
FIG. 2 shows a plan view of the active antisubmarining ramp.
Figure 3:
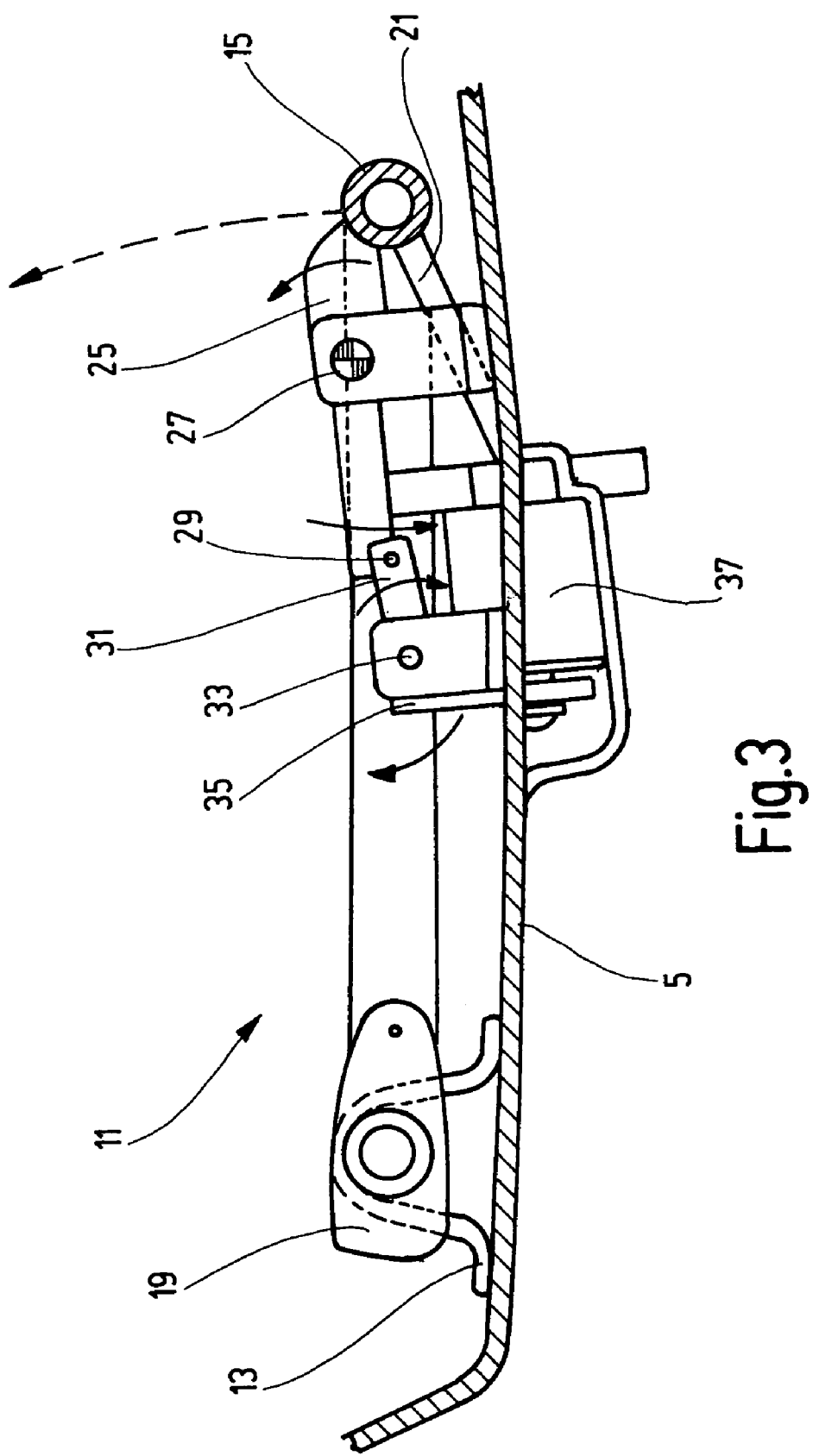
FIG. 3 shows a section along the line III-III in FIG. 2.

A vehicle seat 1 for a motor vehicle has a seat part 3, and the seat part 3 includes a seat part structure 5, which is designed as a shell, and a seat cushion 7, which is positioned on the seat part structure 5. Formed within the seat cushion 7 is a wedge-shaped recess 9. With regard to the normal direction of travel of the motor vehicle, the forward portion of the recess 9 is more vertically expansive than the reward portion of the wedge-shaped recess 9, and the forward portion of the seat cushion 7 is more vertically expansive than the reward portion of the seat cushion 7. The wedge-shaped recess 9 normally ensures that the seat cushion 7 is comfortably flexible.

In order, in a crash, to prevent the occupant from submarining under (e.g., sliding under) the seatbelt provided for the vehicle seat 1, an active antisubmarining ramp 11 is provided which rapidly stiffens the seat cushion 7, so that the submarining movement of the occupant is stopped or prevented. For this purpose, two first bearings 13 movably support a hoop 15. The first bearings 13 are aligned with each other and are positioned on the seat part structure 5 in the region of the front edge the seat part structure 5. The hoop 15 virtually completely encloses a rectangular area. The two first bearings 13 movably support the hoop 15 in such a manner that the hoop 15 can be pivoted about one of its longitudinal sides. Two first springs 17 arranged in each case next to one of the first bearings 13 prestress (e.g., bias) the hoop 15 upward. Stops 19 are respectively attached fixedly to the two ends of the hoop 15. These two ends of the hoop 15 are respectively arranged next to the first springs 17. The stops 19 are initially arranged at a distance from the seat part structure 5. The hoop 15 has a tubular profile (e.g., has a tubular cross section).

Two supports 21 are coupled on the opposite longitudinal side of the hoop 15 and are in each case prestressed (e.g., biased) downward by means of second springs 23. The supports 21 initially bear over their length against the seat part structure 5. Provided in the center of this longitudinal side of the hoop 15 is a catch 25. The catch 25 is mounted pivotably, somewhat eccentrically, on the seat part structure 5 by means of a second bearing 27. The pivot axis of the catch 25 is parallel to the pivot axis of the hoop 15. The catch 25 holds the prestressed hoop 15 in a positive manner. The catch 25 is held at its end facing away from the hoop 15 by a transverse pin 29 of a two-armed lever 31. The two-armed lever 31 is mounted in a manner such that it can pivot about an axis parallel to the catch 25 and to the hoop 15 by way of a third bearing 33. An attractable plate 35 is held by a magnet 37. The attractable plate 35 is attached to the end of the lever 31 that faces away from the transverse pin 29. The magnet 37 may be designed as a normal solenoid which secures the attractable plate 35 when the power supply is continuous. In the present case, however, the magnet 37 has a permanent magnet for securing the attractable plate 35 and a solenoid which is normally not energized. In the event of current being fed to the solenoid portion of the magnet 37, this solenoid builds up a magnetic field which compensates for (e.g., counteracts) or at least weakens the permanent magnet portion of the magnet 37.

The described antisubmarining ramp 11 is, in principle, pre-safe-capable i.e. can be activated even before the crash. The antisubmarining ramp 11 is activated at latest at the beginning of the crash. For this purpose, the power supply to the magnet 37 is switched off or switched on depending on the construction of the magnet 37. In response to this change in the power supply to the magnet 37, the attractable plate 35 is released, and the lever 31 pivots about the axis defined by the third bearing 33. In the process, the attractable plate 35 is raised and the transverse pin 29 lowered. The catch 25 now pivots following the transverse pin 29, so that the catch 25 releases the hoop 15 from its flat position, i.e. the previously described inoperative position. The first springs 17 pivot the hoop 15 upward in such a manner that the hoop 15 is removed from the seat part structure 5 and placed against the front of the two upper sides of the recess 9 (e.g., the hoop 15 pivots in the recess 9). The stops 19 come to bear against the seat part structure 5, to limit the upward movement of the hoop 15. At the same time as the upward movement of the hoop 15, the supports 21 fold downward because of the prestress of the second springs 23, until the supports 21 are stopped by stops (not illustrated in the drawings) of the hoop 15, the seat part structure 5 or the seat cushion 7. As a result, the ends of the supports 21 (i.e., the ends that are distant from the hoop 15) are upon the seat part structure 5 so that the supports 21 support the hoop 15. This prevents a downward movement of the hoop 15 due to vertical forces initiated by the occupant.

The hoop 15 of the antisubmarining ramp 11, which is now in its raised position (operative position) that is schematically illustrated by dashed lines in FIG. 1, stiffens the seat cushion 7, i.e. the distance between the seat cushion 7 and the lap belt section of the seatbelt can be varied only slightly. A relatively great compression of the upholstery of the seat cushion 7 by the occupant in a crash is avoided, so that a submarining of the occupant under the lap belt section is prevented.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A vehicle seat for operating advantageously at least in a crash, the vehicle seat comprising:
    a seat part structure;
    a seat cushion positioned on the seat part structure, wherein the seat cushion includes a recess;
    an antisubmarining ramp mounted for moving in the recess at least in response to, and at the latest at the beginning of, a crash, wherein the antisubmarining ramp comprises a hoop, the antisubmarining ramp being mounted for moving in the recess comprises the hoop being mounted for pivoting in the recess from a flat position into a raised position, and the hoop is biased toward the raised position;
    a retaining element for releasably securing the hoop in the flat position; and
    an actuator operative for
        at least indirectly securing the retaining element so that the retaining element secures the hoop in the flat position, and
        at least indirectly releasing the retaining element at the latest at the beginning of the crash, so that the retaining element releases the hoop, whereby the hoop pivots to the raised position.

2. The vehicle seat as claimed in claim 1, wherein:
    the seat cushion is flexible at least while the hoop is in the flat position, and
    the hoop stiffens the seat cushion while the hoop is in the raised position, so that the seat cushion is less flexible while the hoop is in the raised position than while the hoop is in the flat position.

3. The vehicle seat as claimed in claim 2, wherein the recess is present while the hoop is in the flat position.

4. The vehicle seat as claimed in claim 3, wherein the antisubmarining ramp hoop is in the recess while the hoop is in the flat position.

5. The vehicle seat as claimed in claim 1, wherein:
    the hoop extends at least partially around an at least substantially rectangular area;
    the hoop includes a longitudinal side; and the hoop being mounted for pivoting comprises the hoop being mounted for pivoting about the longitudinal side.

6. The vehicle seat as claimed in claim 1, wherein the actuator is an electrically operated actuator.

7. The vehicle seat as claimed in claim 1, wherein the hoop has at least one support which supports the hoop in the raised position.

8. The vehicle seat as claimed in claim 1, wherein the hoop has at least one stop which limits the movement of the hoop in the crash.

9. The vehicle seat as claimed in claim 1, wherein:
the seat cushion is flexible at least while the hoop is in the flat position, and
the hoop is in the recess and thereby stiffens the seat cushion while the hoop is in the raised position, so that the seat cushion is less flexible while the hoop is in the raised position than while the hoop is in the flat position.

10. The vehicle seat as claimed in claim 9, wherein:
the hoop extends at least partially around an at least substantially rectangular area;
the hoop includes a longitudinal side; and
the hoop being mounted for being pivoted comprises the hoop being mounted for being pivoted about the longitudinal side.

11. A vehicle seat for operating advantageously at least in a crash, the vehicle seat comprising:
a seat part structure;
a seat cushion positioned on the seat part structure, wherein the seat cushion includes a recess;
a structural component mounted for being moved from a first position to a second position; and
a motion-imparting device operative
(a) for moving the structural component from the first position to the second position, and
(b) so that the structural component being moved from the first position to the second position comprises the structural component moving in, and relative to, the recess; and
wherein the seat cushion is flexible at least while the structural component is in the first position, and
wherein the structural component is in the recess and thereby stiffens the seat cushion while the structural component is in the second position, so that the seat cushion is less flexible while the structural component is in the second position than while the structural component is in the first position.

12. The vehicle seat as claimed in claim 11, wherein: the structural component comprises a hoop.

13. The vehicle seat as claimed in claim 11, wherein:
the structural component is upright in the second position, and
the structural component is more inclined in the first position than in the second position.

14. The vehicle seat as claimed in claim 13, wherein:
the structural component comprises a hoop mounted for being pivoted in the recess from the first position to the second position, whereby the hoop is upright in the second position, and the hoop is more inclined in the first position than in the second position, and
the hoop extends at least partially around an area.

15. The vehicle seat as claimed in claim 11, wherein:
the recess is present while the structural component is in the first position, and
the structural component is in the recess while the structural component is in the first position.

16. The vehicle seat as claimed in claim 11, wherein the motion-imparting device includes:
at least one spring that biases the structural component toward the second position,
a retaining element for releasably securing the structural component in the first position, and
an actuator operative for:
(a) at least indirectly securing the retaining element so that the retaining element secures the structural component in the first position, and
(b) at least indirectly releasing the retaining element at the latest at the beginning of the crash, so that the retaining element releases the structural component, whereby the structural component moves to the second position.

17. The vehicle seat as claimed in claim 11, wherein the structural component has at least one support which supports the structural component in the raised position.

18. The vehicle seat as claimed in claim 11, wherein the structural component has at least one stop which limits the movement of the structural component in the crash.

19. The vehicle seat as claimed in claim 11, wherein the actuator is an electrically operated actuator.

20. The vehicle seat as claimed in claim 14, wherein the hoop extends at least partially around an at least substantially rectangular area.

* * * * *

UNITED STATES PATENT AND TRADEMARK OFFICE
CERTIFICATE OF CORRECTION

PATENT NO. : 7,150,500 B2 Page 1 of 1
APPLICATION NO. : 11/350238
DATED : December 19, 2006
INVENTOR(S) : Daniel Hippel et al.

It is certified that error appears in the above-identified patent and that said Letters Patent is hereby corrected as shown below:

Col. 4, Claim 4, line 2, delete "antisubmarining ramp".

Col. 6, Claim 19, line 1, change "11" to --16--.

Signed and Sealed this

Tenth Day of April, 2007

JON W. DUDAS
*Director of the United States Patent and Trademark Office*